UNITED STATES PATENT OFFICE.

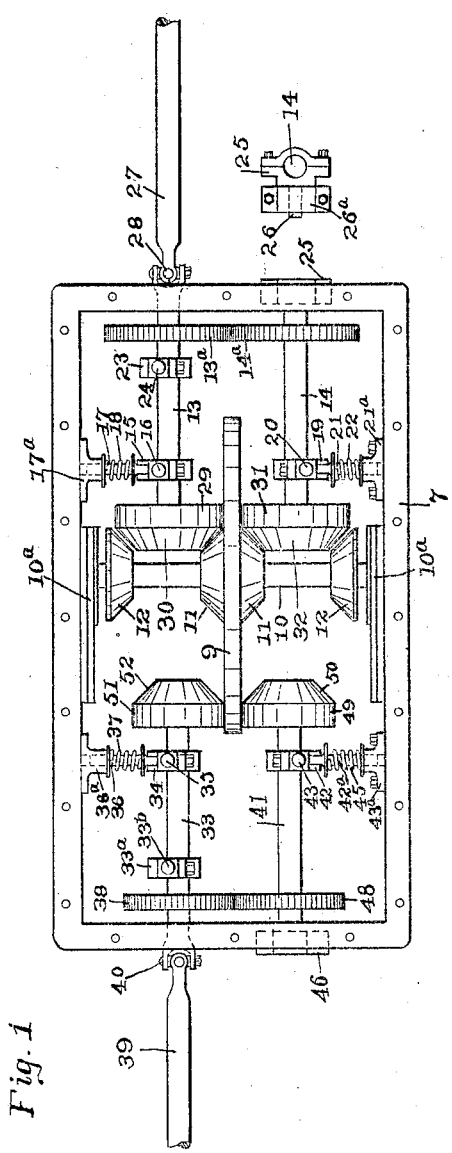

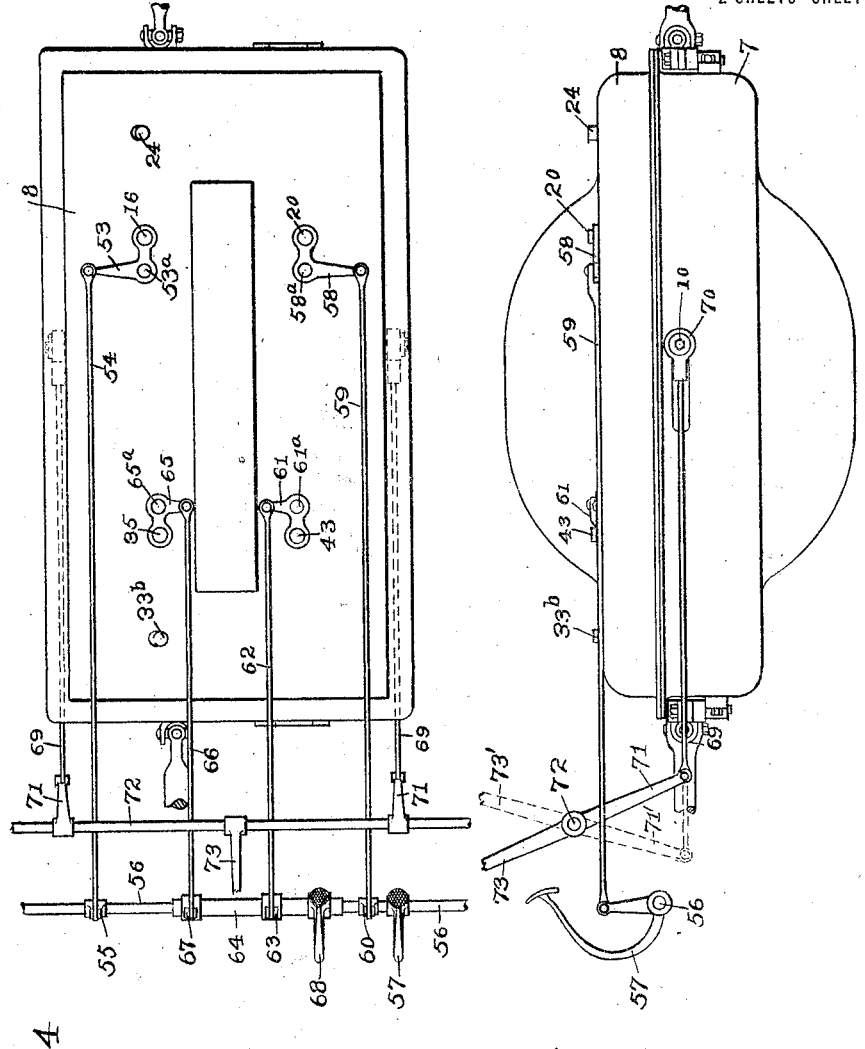

CONRAD A. SLOCUM, OF SEDRO WOOLLEY, WASHINGTON.

VARIABLE-SPEED POWER TRANSMISSION.

1,378,570. Specification of Letters Patent. Patented May 17, 1921.

Application filed March 15, 1921. Serial No. 452,473.

*To all whom it may concern:*

Be it known that I, CONRAD A. SLOCUM, a citizen of the United States, and resident of Sedro Woolley, in the county of Skagit and State of Washington, have invented a new and useful Variable-Speed Power Transmission, of which the following is a specification.

My invention relates to improvements in variable-speed, friction, power transmissions, and the objects of my invention are: to provide means for changing the speed of the work shaft, of a power transmission, through the entire range of speed variation without interrupting transmission of power; and to provide means of reversing the direction of revolution of the work shaft in the mechanism of the transmission, and also to reduce shaft end thrust and increase the surfaces of frictional contact when the work shaft is operating at lowest speed, and the prime mover at highest speed. I attain these objects with the mechanism illustrated in the two sheets of accompanying drawings in which Figure 1 is a plan view of my transmission with the case cover removed, Fig. 2 is a side elevation view of the transmission with the case in section on a longitudinal, vertical plane, Fig. 3 is a left-hand end elevation of Fig. 2 in section on the line 3—3, Fig. 4 is a plan view of my transmission showing control mechanism, and Fig. 5 is a side elevation of Fig. 4.

Similar characters refer to similar parts throughout. Certain parts are broken away for lack of space.

More particularly: 7 is the lower part of the gear case and provides the frame of the mechanism.

8 is the top or cover of the gear case.

9 is a two-surface friction disk mounted fixed on shaft 10.

10 a shaft mounted for revolution in slidable bearings $10^a$, $10^a$ and mounts fixed disk 10 and conical, friction gears 11, 11 and 12, 12.

11, 11 are equal conical gears fixed to disk 9 in hub relation.

12, 12, are a pair of equal conical gears mounted fixed on shaft 10 near its ends with truncated ends facing.

13 is the section of the work shaft within case 7, it is mounted for revolution in hinged bearings 15 and 23 and has a toggle joint on its outer end. $13^a$ is a spur gear mounted fixed on shaft 13.

14 is an auxiliary work shaft mounted in hinged bearing 19 and pivoted bearing 25. $14^a$ is a spur gear equal to gear $13^a$, with which it engages, and is mounted fixed on shaft 14.

15 is a bearing mounting the inner end of shaft 13. Bearing 15 is in every way similar to bearing 34, shown in Figs. 1 and 3 which has a hinge joint below at $34^a$.

16 is a stud on the upper end of bearing 15 which protrudes through cover 8.

17 is a pin hinged in the upper end of bearing 15 and mounted for reciprocation in a hole in boss $17^a$ which is fastened to case 7.

18 is a spiral spring, operating under compression, mounted on pin 17 and bearing on boss $17^a$ and bearing 15.

19 is a bearing mounting the inner end of shaft 14, and hinged at $19^a$.

20 is a stud on the upper end of bearing 19 which protrudes through cover 8.

21 is a pin hinged in the upper end of bearing 19 and mounted for reciprocation in a hole in boss $21^a$ fastened to case 7.

22 is a helical spring operated under compression on pin 21 between bearing 19 and boss $21^a$.

23 is a bearing near the outer end of shaft 13, the lower end of which is hinged at $23^a$.

24 is a stud on the upper end of bearing 23 which is mounted in a slightly oblong hole in cover 8.

25 is a bearing mounting the outer end of shaft 14.

26 is a stud on the lower side of bearing 25 pivotal in a boss $26^a$ fastened to case 7.

27 is a continuation of work shaft 13 to which it is joined by toggle joint 28.

29 is a cylindrical friction gear mounted fixed on the inner end of shaft 13 engageable with disk 9.

30 is a conical gear fixed to the inner end of gear 29, with which it is concentric, engageable separately with one of gears 11 and one of gears 12.

31 is a cylindrical friction gear, equal to gear 29, mounted fixed on the inner end of shaft 14, engageable with disk 9.

32 is a conical gear fixed concentric to the inner end of gear 31, equal to gear 30, and engageable separately with one of gears 11 and one of gears 12.

33 is the inner end of a prime-mover shaft mounted in bearings 33ª and 34. 33ª is a bearing mounting the outer end of shaft 33, hinged at 33ᶜ to boss 48.

34 is a bearing mounting the inner end of shaft 33, hinged to case 7 similarly to bearing 19, and having stud 35 fixed to its upper end. Said stud protrudes through cover 8.

36 is a pin hinged to the upper end of bearing 34 and mounted for reciprocation in a hole in boss 36ª fastened to case 7.

37 is a helical spring operating under compression on pin 36 between boss 36ª and bearing 34.

38 is a spur gear mounted fixed on shaft 33.

39 is the extension of the prime-mover shaft fastened to shaft 33 at toggle joint 40.

41 is an auxiliary prime-mover shaft mounted in bearings 42 and 46.

42 is a bearing mounting the inner end of shaft 41 hinged at 44ª in boss 44 which is fastened to case 7.

43 is a stud on the upper end of bearing 42 protruding through cover 8. 42ª is a pin hinged to bearing 42 and mounted for reciprocation in a hole in boss 43ª fastened to case 7.

45 is a helical spring mounted under compression on pin 42ª between boss 43ª and bearing 42.

46 is a bearing mounting the outer end of shaft 41 and pivoted in a manner similar to bearing 25, described.

47 is the stud on which said bearing 46 is mounted.

48 is a spur gear mounted fixed on shaft 41, engaged with its equal gear 38.

49 is a cylindrical friction gear mounted fixed on the inner end of shaft 41 engageable with friction disk 9 on the opposite side to gear 51.

50 is a conical friction gear fixed concentric to the inner end of gear 49 and engageable with gear 11.

51 is a cylindrical friction gear, the equal of gear 49, mounted fixed on the inner end of shaft 33 and engageable with disk 9 on the opposite side from gear 49 and simultaneously therewith.

52 is a conical friction gear, the equal of gear 50, fixed concentric on the inner end of gear 51 engageable with gear 11.

53, see Figs. 4 and 5, is a bell crank pivoted at 53ª on the outside of cover 8 and engaged with stud 16 of bearing 15.

54 is a rod connecting bell crank 53 with crank 55.

55 is a crank on rocker shaft 56 connected to rod 54.

56 is a rocker shaft mounted for revolution in hollow shaft 64.

57 is a pedal crank fastened to shaft 56.

58 is a bell crank fulcrumed to the outside of cover 8 at 58ª and engaged with stud 20 on the upper end of bearing 19.

59 is a rod connecting bell crank 58 with crank 60.

60 is a crank fixed on shaft 56 and connected to rod 59.

61 is a bell crank fulcrumed at 61ª on cover 8 and engaged with stud 43 on bearing 42.

62 is a rod connecting bell crank 61 with crank 63.

63 is a crank fixed to hollow shaft 64.

64 is a hollow shaft mounted for revolution on shaft 56, which is mounted in bearings not shown.

65 is a bell crank fulcrumed at 65ª on cover 8 and engaged with stud 35 in bearing 34.

66 is a rod connecting bell crank 65 with crank 67.

67 is a crank fixed on hollow shaft 64.

68 is a pedal crank fixed on hollow shaft 64.

69, 69 are rods, each having an eye 70 engaged with one protruding end of shaft 10.

71, 71 are cranks fixed to rocker shaft 72 and connected to rods 70.

72 is a rocker shaft mounted in bearings not shown.

73 is a hand lever fixed to shaft 72.

In operation: it is assumed that prime-mover shaft 39 is revolving. As illustrated, springs 37 and 45 cause friction gears 49 and 51 to engage with disk 9 on opposite sides thereof, near its periphery, causing same to revolve shaft 10. In thus transmitting power from shaft 39 to shaft 10 auxiliary shaft 41 plays an important part in that the frictional hold on disk 9 is doubled and no end thrust is delivered to shaft 10. As illustrated, in full lines, disk 9 is caused to revolve at minimum speed. But by putting hand lever 73 to its dotted position at 73′ disk 9 is carried to its dotted position at 9′ in Fig. 2 and conical gears 50 and 52 are caused to engage with gears 11, said engagement causing them to mount said gears 11 till gears 49 and 51 are out of engagement with disk 9, when shaft 10 is revolved at its maximum rate.

Gears 49 and 51 are smaller in diameter than gears 29 and 31, as shown, and never engage with gears 12, 12.

It can be noted that as disk 9 is moved to different positions by lever 73 the whole range of rates of revolution of shaft 10 between its maximum and minimum is obtained.

The use of equal gears 29, 30 and 31, 32 on the work shafts affords double frictional contact with disk 9 and freedom from end thrust in shaft 10, as noted with respect to gears 49 and 51.

To reverse the direction of revolution of work shaft 27 pedal 57 is pressed forward and gears 30 and 32 are engaged with and held in contact with gears 12, 12 against opposing springs 18 and 22. Reversal can thus only occur when disk 9 is in its full-line position and revolving at slowest speed.

To throw the transmission out of action pedal lever 68 is shoved forward and gears 49 and 51 are separated, against pressure of springs 37 and 45 and said gears are moved out of engagement with disk 9.

Having thus fully disclosed my invention, what I claim as new and desire to secure by Letters Patent is,—

1. In a power transmission, in combination, a friction disk gear mounted fixed centrally on a revoluble shaft which is slidable to parallel positions; a conical friction gear fixed concentric to each side of said disk; a conical friction gear mounted fixed on and near each end of said slidable shaft; main and auxiliary friction gears mounted fixed on separable shafts, on opposite sides of said disk, engageable therewith and with said central conical gears; main and auxiliary friction gears mounted fixed on separable driven shafts, on opposite sides of said disk, engageable separately with said disk, with said central conical gears, and with said end conical gears; means to engage and disengage said driver gears in and from contact with said disk and with said central conical gears; means to engage and disengage said driven gears in and from contact with said disk, with said central conical gears and with said shaft-end conical gears; and means to move said disk shaft to parallel positions.

2. In a power transmission, in combination, a transmission case; slide, shaft bearings slidable in slideways fastened to said case; a disk shaft mounted for rotation in said slide bearings; a friction disk gear mounted fixed midway on said disk shaft; a conical friction gear fastened on each side of said disk concentric therewith; a conical friction gear mounted fixed on said disk shaft near each end of the same; main driver-shaft bearings hinged to said case; a main driver shaft mounted for revolution in said main-driver, shaft bearings; a spur gear mounted fixed on said main-driver shaft; a main-driver friction gear mounted fixed on said main-driver shaft engageable with said disk or with one of said central, conical gears fastened thereto; a spring adapted to react to force said main-driver friction gear to engage with said disk, or with said central conical gear; two auxiliary driver shaft bearings, one hinged and one pivoted to said case; an auxiliary-driver shaft mounted for rotation in said hinged and pivoted bearings; a spur gear mounted fixed on said auxiliary-driver shaft engaged with said main-driver shaft spur gear; an auxiliary-driver friction gear mounted fixed on said auxiliary-driver shaft engageable with said disk or with the other of said central conical gears fastened to said disk on the side opposite to said main-driver friction gear; a spring adapted to force said auxiliary driver friction gear to engage with said disk or with said central friction conical gear; main-driven shaft bearings hinged to said case; a main driven shaft mounted for revolution in said hinged bearings; a spur gear mounted fixed on said main-driven shaft; a main-driven friction gear mounted fixed on said main-driven shaft engageable with said disk or with one of said central conical friction gears, also engageable with one of said conical friction gears near one end of said disk shaft; a spring adapted to react to force said main-driven friction gear in connection with said disk, or with said central conical gear; two auxiliary-driven shaft bearings, one hinged to said case and one pivoted to said case; an auxiliary-driven shaft mounted for rotation in said hinged and pivoted bearings; a spur gear mounted fixed on said auxiliary-driven shaft engaged with said spur gear on said main-driven shaft; an auxiliary-driven friction gear mounted fixed on said auxiliary-driven shaft engageable with the other side of said disk, with said other central conical gear or with said other conical gear on the other end of said disk shaft; a spring adapted to react to force said driven-auxiliary gear in contact with said disk or with said central conical gear; means to move said disk shaft forth and back to parallel positions; means to move said driven friction gears from contact with said disk or with said central conical gears to contact with said conical gears on the ends of said disk shaft; and means to move said driver friction gears out of contact with said disk.

3. In a power transmission in combination, a transmission case; slide shaft bearings slidable in slideways fastened to said case; a disk shaft mounted for rotation in said slide bearings; a friction disk mounted fixed midway on said shaft; a conical friction gear fastened concentric on each side of said disk; a conical friction gear mounted fixed on said disk shaft near each end; main-driver shaft bearings hinged to said case; a main-driver shaft mounted for revolution in said bearings; a spur gear mounted fixed on said main-driver shaft; a cylindroconical, main-driver friction gear mounted fixed on said main-driver shaft engageable with said disk or with one of said central conical friction gears on said disk; a spring adapted to react to force said cylindroconical driver gear in engagement with said disk or with said central conical gear; two auxiliary-driver shaft bearings, one hinged and one pivoted to said case; an auxiliary driver shaft mounted for revolution in said bearings; a spur gear mounted fixed on said auxiliary-driver shaft engaged with said spur gear on said main-driver shaft; an auxiliary-driven, cylindroconical friction gear mounted fixed on said auxiliary-driver shaft, engageable with said disk or with the other of said central conical friction gears on the side of said disk opposite to said driver friction gear; a spring adapted to react to force said auxiliary-driver gear to engage with said disk or with said other central, conical friction gear; main-driven shaft bearings hinged to said case; a main-driven shaft mounted for rotation in said bearings; a spur gear mounted fixed on said main-driven shaft; a main-driven cylindroconical friction gear mounted fixed on said main-driven shaft engageable with said disk, or with one of said central conical friction gears, or with one of said conical friction gears on one end of said disk shaft; a spring adapted to react to cause said main-driven gear to engage with said disk, or with one of said central conical gears; two auxiliary-driven shaft bearings, one hinged and the other pivoted to said case; an auxiliary-driven shaft mounted for rotation in said bearings; a spur gear mounted fixed on said auxiliary-driven shaft engaged with said spur gear on said main-driven shaft; a cylindroconical, friction gear mounted fixed on said auxiliary-driven shaft engageable with said disk, or said other central conical friction gear, or with said other conical friction gear near the other end of said disk shaft; a spring adapted to react to cause said auxiliary-driven gear to engage with said disk, on the opposite side from said main-driven gear, or with said other central conical gear; means to move said disk shaft bearings simultaneously in said slideways together with said shaft and said friction gears thereon; means to move said driver friction gears out of engagement with said disk or with said central conical gears; and means to move said driven friction gears out of engagement with said disk, or said central conical gears and into engagement with said conical friction gears on the ends of said disk shaft.

CONRAD A. SLOCUM.